Aug. 14, 1951  F. W. KNOTT  2,564,264
WINDOW
Filed Feb. 12, 1947  6 Sheets-Sheet 1
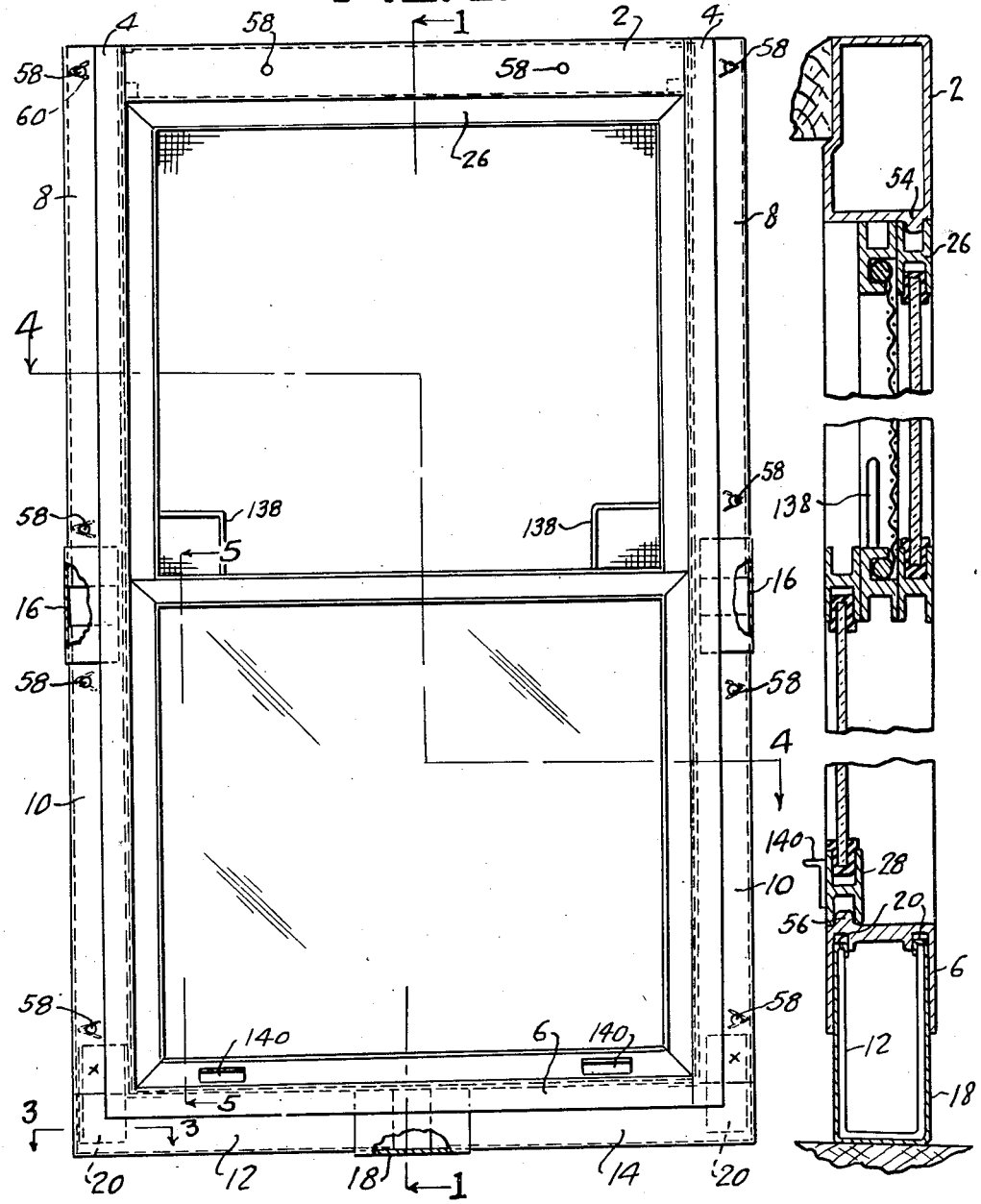
INVENTOR.
Frank W. Knott
BY Hauke & Hardesty
ATTORNEYS

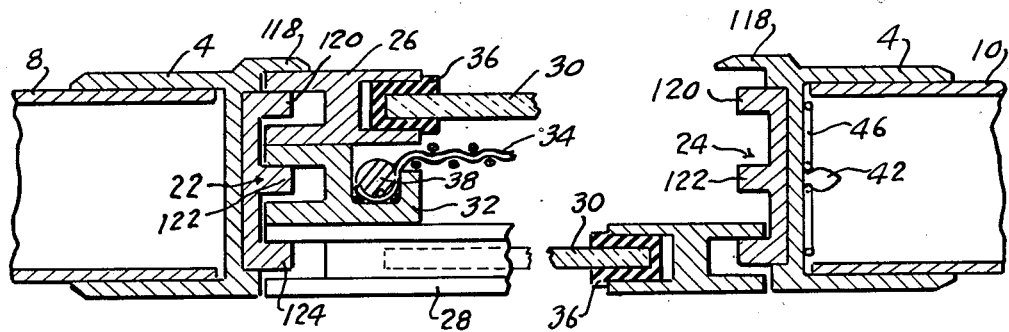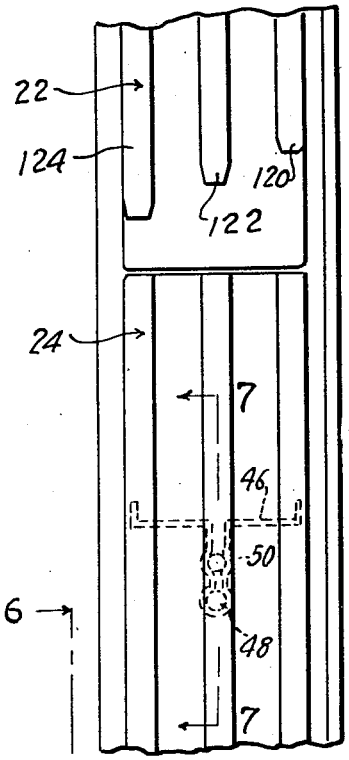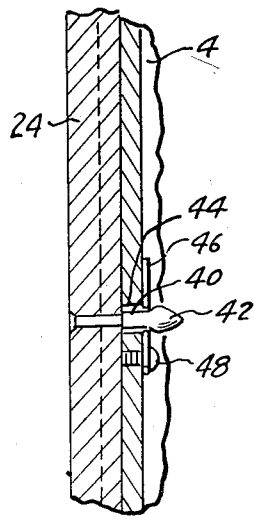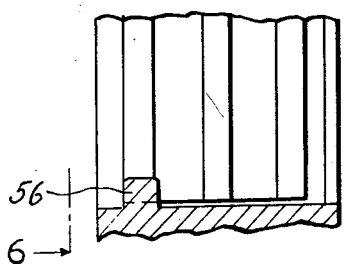

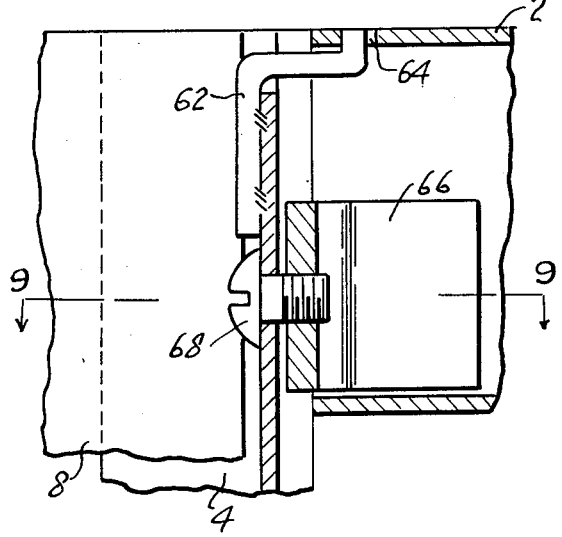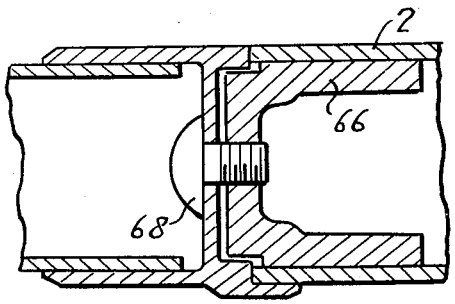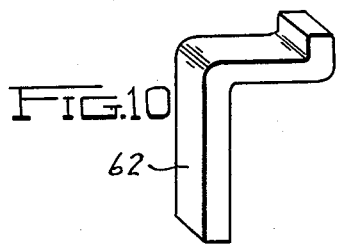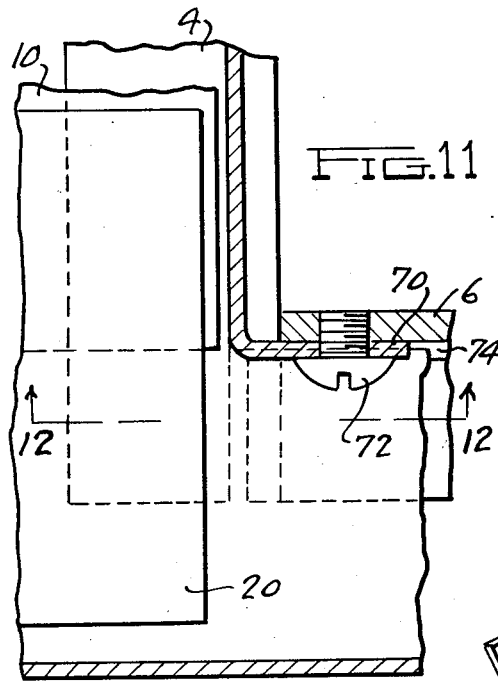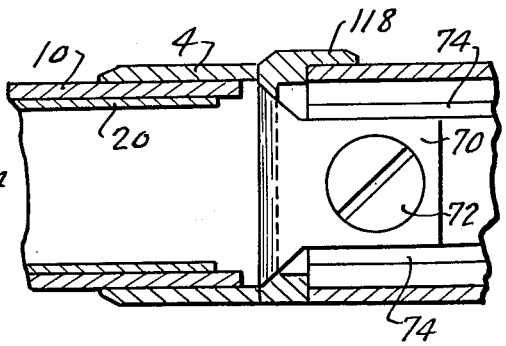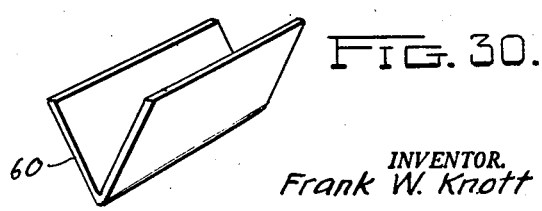

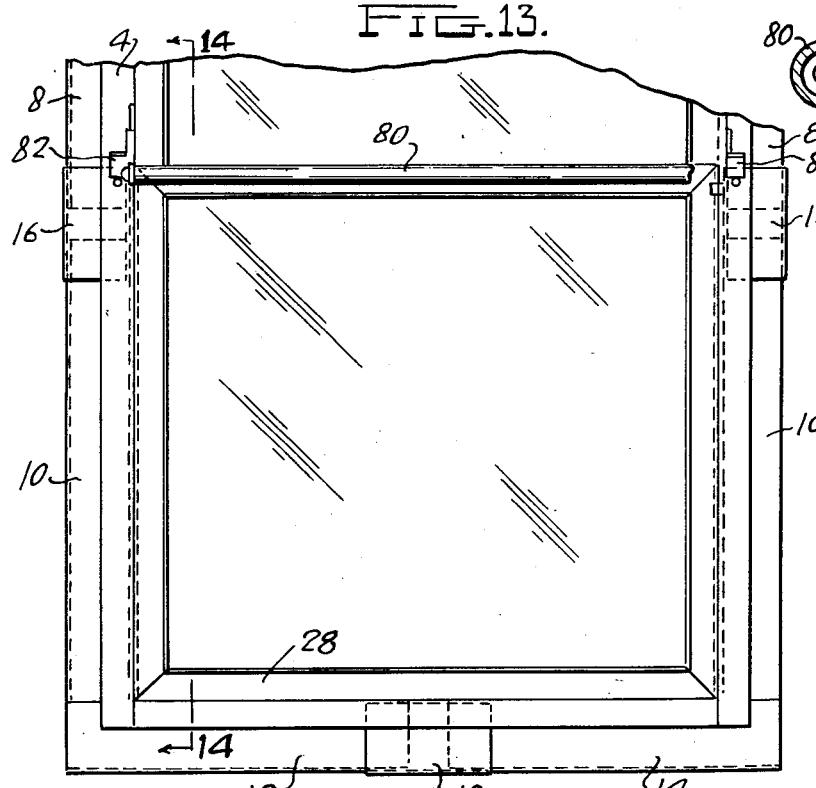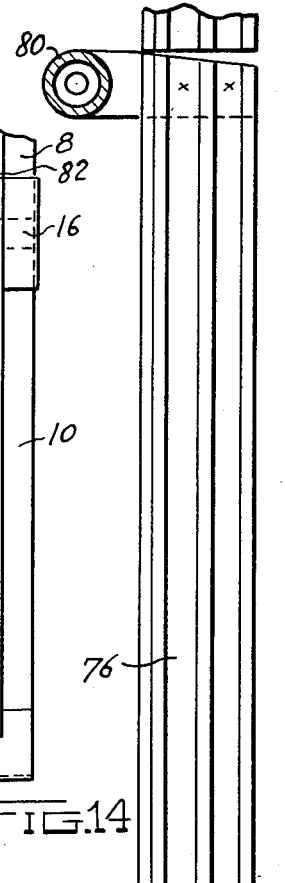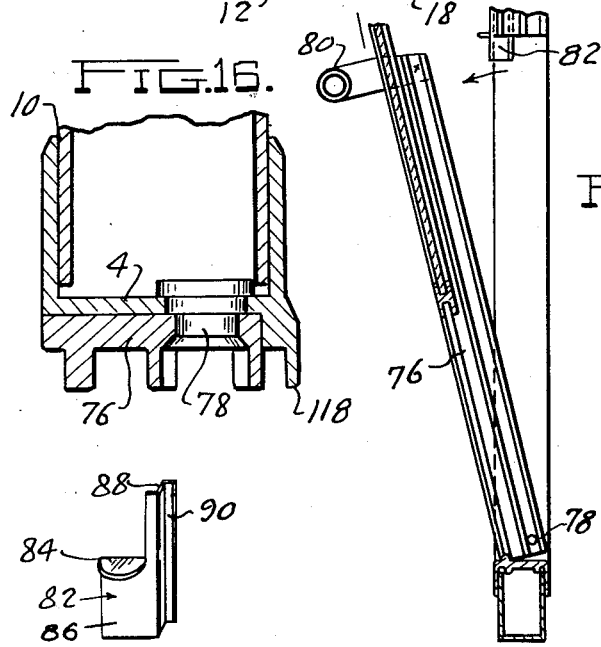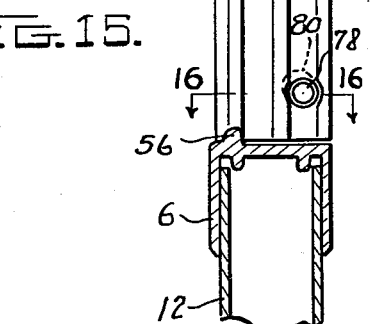

Aug. 14, 1951 F. W. KNOTT 2,564,264
WINDOW
Filed Feb. 12, 1947 6 Sheets-Sheet 5
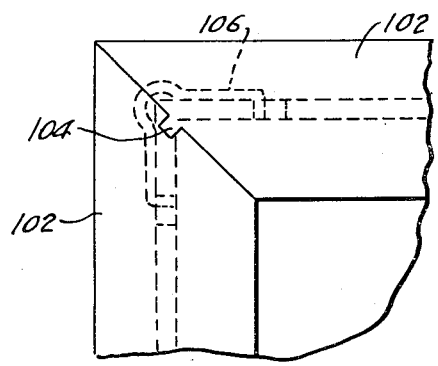
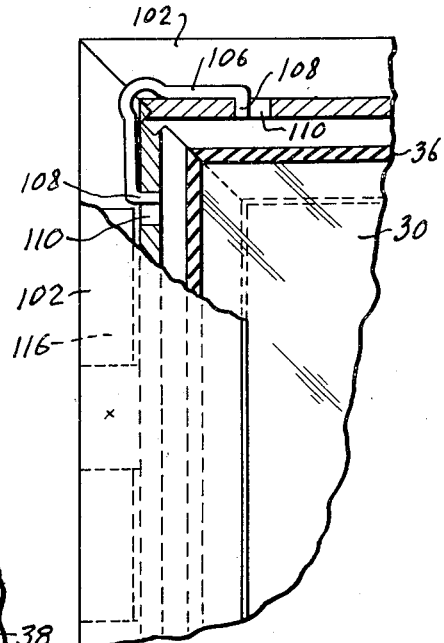
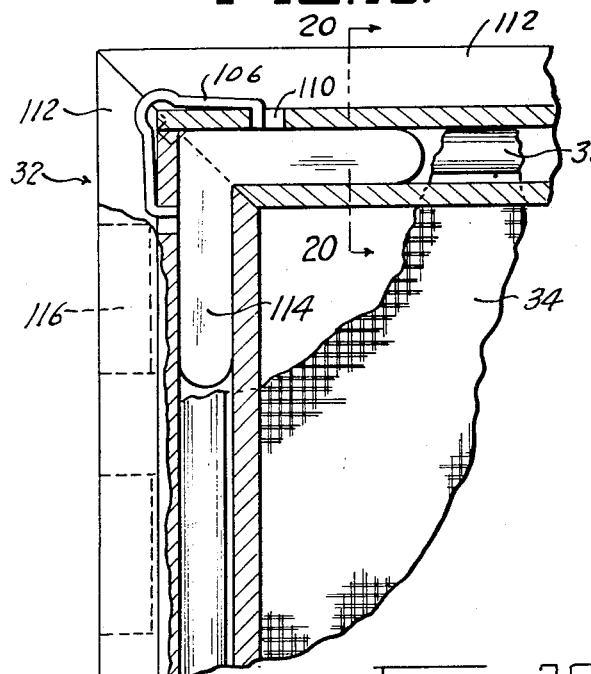
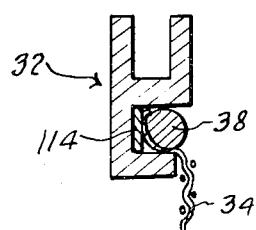
INVENTOR.
Frank W. Knott
BY
Hauke & Hardesty
ATTORNEYS Aug. 14, 1951　　　　F. W. KNOTT　　　　2,564,264
WINDOW
Filed Feb. 12, 1947　　　　　　　　　　6 Sheets-Sheet 6
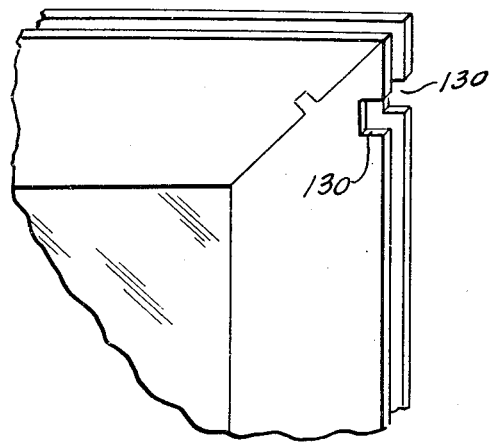
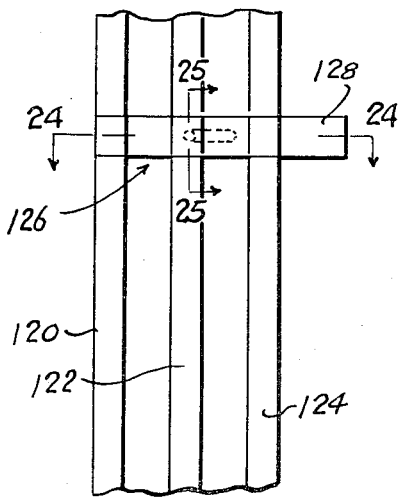
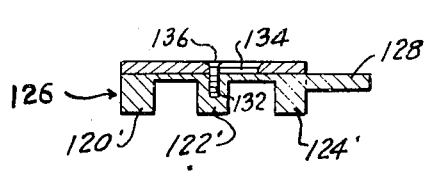
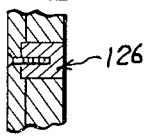
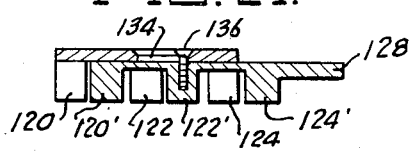
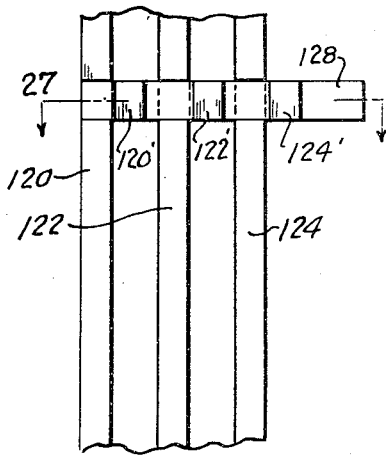
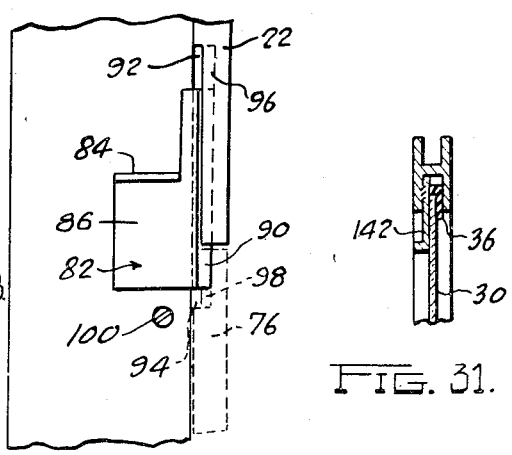
INVENTOR.
Frank W. Knott
BY Hauke & Hardesty
ATTORNEYS Patented Aug. 14, 1951

2,564,264

UNITED STATES PATENT OFFICE 2,564,264

WINDOW

Frank William Knott, Detroit, Mich., assignor to Wisco, Inc., Detroit, Mich., a corporation of Michigan Application February 12, 1947, Serial No. 728,171

9 Claims. (Cl. 160—101)

1

This invention relates to a window, especially to a window which may be adjusted somewhat to accommodate variations in the wall opening which the window is adapted to cover.

The demand for large scale housing, and the high cost of housing, have created a demand for more efficient building methods. One method of satisfying the demand for lower cost, higher quality housing is quantity production. Quantity production necessitates a high degree of interchangeability of parts and this is accomplished with difficulty in the building industry because of the difficulty of attaining uniformity in dimensions. Thus is is not practical to make houses having window openings built to precise limits in order that various standard size window openings may receive standard, mass-production built windows having fixed dimensions.

It is an object of this invention to provide a window having a variable outside dimension so that it is not necessary to hold the window openings in building walls to extremely close tolerances. This and other objects are accomplished in a window so made that the outside dimension can be varied within rather wide limits. The window is so made that no "on-the-job tailoring," in the way of cutting to size, is necessary. A window made according to this invention can be readily adjusted to size in a few minutes, and is easily installed in the window opening of the building wall.

In the drawings:

Fig. 1 is a vertical sectional view through a window made according to this invention (section on line 1—1 of Fig. 2).

Fig. 2 is a view in elevation of the invention as seen from the inside of the house or building.

Fig. 3 is a view in section on line 3—3 of Fig. 2.

Fig. 4 is a broken view in section substantially on line 4—4 of Fig. 2.

Fig. 5 is a fragmentary view partly in section substantially on line 5—5 of Fig. 2, with the sash frames removed.

Fig. 6 is a detail fragmentary view showing a portion of the window frame and illustrating the removability of a portion of the sash guide rail; Fig. 6 is a fragmentary view from the direction of the arrows 6—6 of Fig. 5.

Fig. 7 is a fragmentary view in section on line 7—7 of Fig. 5.

Fig. 8 is a partial sectional view showing a detail of construction of the window frame. More specifically, Fig. 8 shows in detail the upper left hand corner of the frame of Fig. 2.

Fig. 9 is a view in section on line 9—9 of Fig. 8.

2

Fig. 10 is a perspective view in detail of one of the elements shown in Fig. 8.

Fig. 11 is a partial sectional view of the lower left hand corner of the frame as shown in Fig. 2.

Fig. 12 is a view in section on line 12—12 of Fig. 11.

Fig. 13 is a partial elevation view of another embodiment of this invention.

Fig. 14 is an enlarged view in section on line 14—14 of Fig. 13, shown with the sash frames removed.

Fig. 15 is a partial sectional view showing how a portion of the guide rail may be displaced to permit removal of the sash frames.

Fig. 16 is a view in section on line 16—16 of Fig. 14.

Fig. 17 is a view of one corner of the sash frame showing structural details.

Fig. 18 is a view partially in section and partially in elevation of a corner of a window sash frame showing structural details.

Fig. 19 is similar to Fig. 18, except that it is a detail of the screen sash.

Fig. 20 is a view in section on line 20—20 of Fig. 19.

Fig. 21 is a fragmentary view in elevation of one edge of a sash frame showing the friction spring.

Fig. 22 is a view in perspective of one corner of a glass sash frame showing a detail of the lock structure.

Fig. 23 is a view in elevation of a portion of the guide rail and showing the window lock.

Fig. 24 is a view in section on line 24—24 of Fig. 23.

Fig. 25 is a view in section on line 25—25 of Fig. 23.

Fig. 26 is a view similar to Fig. 23 except that it shows the window lock in its locking position.

Fig. 27 is a view in section on line 27—27 of Fig. 26.

Fig. 28 is a detail view in elevation showing the mechanism by which the displaceable guide rail of the window of Fig. 13 is held in place.

Fig. 29 (Sheet 4) is a detail perspective view of the retaining member of Fig. 28.

Fig. 30 (Sheet 3) is a perspective view of the reinforcing element used in fastening the window in place, and Fig. 31 is a detail sectional view showing an alternative glass sash frame handle.

Referring now to the drawings in detail, a window frame forming a closed rectangular loop is shown as made up of a top member 2, side members 4, and bottom member 6. As is best seen in Fig. 4, the side members 4 of the frame are open channels, the openings being at the outer edges. As can be seen in Fig. 1, the bottom member 6 is also a channel opening downwardly. Telescoping with the outwardly opening recesses in each side member 4 is a pair of edge members 8 and 10. Edge members 8 and 10 are also channel shaped in cross section, but having the channel openings facing inward. Edge members 12 and 14 telescope with the recess in the bottom frame member 6. The members 12 and 14 are channel shaped in cross section having their openings extending upward. A bridge member 16 telescopes with the two side edge members 8 and 10 and closes the gap between them; similarly, a bridge member 18 telescopes with the bottom edge members 12 and 14 and closes the gap between them. As is best seen in Fig. 1, the bridge member 18 is a channel having inwardly turned edges 19 which cooperate with the edges of members 12 and 14. The bridge members 16 are similarly constructed. At its lower end, each edge member 10 has secured to it, as by welding, riveting, or the like, an internal guide piece 20 which extends telescopingly into edge member 12 or 14.

At its two sides, on the inside edge, the window frame is provided with guide rails to guide the sliding movement of a plurality of sash frames. As can best be seen in Figs. 4, 5, 6 and 7, the upper half of the window frame is provided with a guide rail portion 22. Guide rail portion 22 is preferably permanently secured to the side frame member 4, as by welding, riveting, or the like. The lower half of each side frame member 4 is provided with a removable guide rail portion 24.

The complete guide rail, consisting of portions 22 and 24, is shown here as having three spaced longitudinal ribs which cooperate with grooves or recesses in the edges of the aforesaid sash frames. As can be seen in the drawings, this invention embodies three sash frames, each of which carries a suitable barrier membrane. In the two sash frames 26 and 28 the barrier membrane is shown to be a sheet of window glass 30. In the sash frame 32 the barrier membrane is shown to be a fly-screen 34. The two glass sash frames 26 and 28 have outwardly extending channels at their outer edges which cooperate with the two outer ribs on the guide rails, and inwardly extending channels adapted to receive a channel-shaped resilient weather strip 36 made of any suitable material such as rubber or the like. The channel-shaped weather strip 36 receives the edge of the barrier membrane, in this case the glass panel 30.

The screen sash frame, shown here as being disposed between the two glass sash frames, is similarly provided in the vertical stiles thereof with outwardly directed grooves or recesses which receive the middle ribs on the guide rails. The screen sash frame is also provided in one side thereof adjacent its inside edge with a groove which receives the barrier membrane, in this case screen 34. Screen 34 is held in place by a resilient retaining member 38, retaining member 38 being wedged into the transverse groove, and holding the edge of screen 34 between it and the walls of the groove. Retaining member 38 preferably is made of an inexpensive extruded plastic.

Referring now especially to Figs. 5, 6 and 7, it will be seen that each of the removable guide rail portions 24 is provided with a pin 40 having a head 42. Pin 40 extends through an opening 44 in the side frame member 4. At the inside of the channel of the side frame member 4 there is a spring clip 46 secured in position by any suitable means such as screw 48. Spring clip 46 is provided with an enlarged intermediate portion 50 through which the head 42 is adapted to extend. As can be seen in Fig. 6, the inner face of side frame member 4 is notched at 52 to permit a knife blade, screwdriver, or similar instrument, to be inserted in back of guide rail portion 24 to permit it to be removed from the side frame member 4.

As is best seen in Fig. 1, the top frame member 2 is provided with a projection 54, and the bottom frame member 6 is provided with a projection 56. Projections 54 and 56 cooperate with the outwardly directed top and bottom channels in the glass frames 26 and 28 respectively to provide an effective weather seal. The removable guide rail portions 24 are disposed in notched-out recesses in the projections 56 (see Fig. 6).

The window is held in place in the opening of the building wall by any suitable fastening means such as screws 58 extending through the top frame member 2 and through the side edge members 8 and 10. In order to prevent crushing of the channel shaped edge members 8 and 10, a V-shaped reinforcing member 60 is provided at each screw 58. A detail of the reinforcing member is shown in Fig. 30 (Sheet 3).

Figs. 8–12 show structural details of the window frame. From these figures it can be seen that the side frame member 4 has secured thereto, as by welding, an S-shaped hook or bracket 62. The top frame member 2 is provided at each end with an opening 64 into which the free end of hook 62 fits. A strut 66 is secured to the inside of hollow frame member 2 by any suitable means such as spot welding or the like, and is adapted to receive the threaded portion of a screw 68. Screw 68 permanently holds the two frame members 2 and 4 together.

At its lower end, each frame member 4 is provided with a tongue 70 which is bent out of the plane of the bottom of the channel of the frame member 4. A screw 72 holds tongue 70 securely assembled to the bottom frame member 6. The underside of the bottom frame member 6 is provided with two parallel ribs 74. The tongue 70 lies between and bears against these ribs to give added rigidity to the assembly (Fig. 12).

Figs. 13, 14, 15 and 16 show another embodiment of this invention. In this embodiment the construction differs from the above described embodiment chiefly in the way in which the lower portion of the guide rail is made displaceable. In the foregoing embodiment the displaceable portion of the guide rail is made completely removable. In the embodiment shown in Figs. 13–16, the displaceable guide rail portion 76 is adapted to pivot about the lower weather seal projection 56. Guide rail portion 76 carries a pin 78 which extends through an elongated opening 80 in the side frame member 4. Pin 78, working in the elongated opening 80, serves to limit the outward movement of the guide rail portion 76; see Fig. 5. If desired, a cross bar 80 may be provided to connect the two opposite pivotal guide rail portions 76. It will be understood by those skilled in the art that the window will function without the cross bar 80 but that the addition of this bar gives the assembly greater strength and rigidity.

The pivotable guide rail portion 76 is held in the position shown in Fig. 14 by means of a retaining member 82, shown in detail in Figs. 28 and 29. The retaining member 82 is provided with a handle 84, extending forwardly from a panel 86. Extending back from panel 86 there is provided a web 88 which carries a lock tongue 90. As is best seen in Fig. 28, web 88 is reciprocable in a slot 92 provided in the lower end of the guide rail portion 22. A similar slot 94 is provided in the pivotable guide rail portion 76. Perpendicular to slot 92, there is a slot 96 in the permanent portion 22 of the guide rail, slot 96 being adapted to receive the lock tongue 90. Similarly, a slot 98, perpendicular to slot 94, is provided in the pivotable portion 76 of the guide rail. A stop screw 100 may be provided to limit the downward movement of the retaining member 82 to prevent its falling out of place when the pivotable portions 76 are in the position shown in Fig. 15.

Figs. 17-21, inclusive, show details of the sash frames. Each sash frame comprises four frame members 102 each of which is cut at each end on a diagonal plane. This plane is shown as being substantially at 45 degrees to the edge although it will be understood that any other angle can be used. As is best seen in Fig. 17, one of the frame members 102 is provided with a tongue 104 which cooperates with a groove in the end of the adjacent frame member. This tongue and groove joint lies in the aforesaid diagonal plane.

The tongue and groove joint is secured against separation by a clip 106. Clip 106 has inwardly turned ends 108 which fit into openings 110 in the bottom of the channel formed by the outer edge of the sash frame.

The screen sash frame 32 is similar to the glass sash frames 26 and 28 in that the four frame members 112 are held together by the same sort of tongue and groove joint and the same clip 106. The screen sash frame also resembles the glass sash frame in that its outer edge is provided with an outwardly opening channel. It differs from the glass sash frames, however, in that the channel at its inner edge opens in a direction transverse to the plane of the barrier membrane. In this transverse channel there is provided at the corner a reinforcing member 114. Reinforcing member 114 is held in place at the bottom of the transverse channel by means of screen 34 and the plastic retaining member 38.

All of the sash frames are preferably provided with friction means to hold the sash frame in any vertical position in which it may be placed in the rectangular window frame. To this end, a thin leaf spring 116 is provided in the outwardly extending channel in at least one side member of the sash frame. Spring 116 may be secured in place by any suitable means, as by welding or riveting. As can be seen in Figs. 4, 12, and 16, the side frame members 4 are provided with an outer weather strip 118 for an effective weather seal. As is best seen in Fig. 4 the space between weather seal 118 and the adjacent guide rail projection 120 is enough to permit a sliding fit of one side of the sash frame channel. Spring 116 is so disposed as to bias the outermost leg of the sash frame channel inward against guide rail projection 120. Similarly, the screen sash 32 is biased inward against the guide rail projection 122, and the inside glass sash frame 28 is biased inward against the guide rail projection 124. As can be seen in Fig. 4, the three sash frames fit closely together so as to provide a storm-tight closure. As used here, "storm-tight" does not mean absolutely air or water tight, but tight enough to prevent the passage of windblown rain through the window to the interior space. For the purpose of further insuring a weather tight seal, a spring 116 may, and preferably will, be provided on each side of a sash frame.

Figs. 22-27, inclusive, show the means for locking a window made according to this invention. As is evident from Fig. 1, all three sash frames overlap in the middle of the window. Somewhere in the region of overlapping, the lock means is provided in the displaceable portion of the guide rail. The lock means consists of a displaceable section 126. To provide this lock means, a narrow channel is provided, as by machining, across the guide rail and in it is placed the lock section 126. This lock section 126 has a configuration similar to that of the guide rail, so that in the unlocked position, the projections on the lock match those of the guide rail, and no obstacle is presented to the free up and down sliding of the frames. However, when the lock 126 is pulled inward by means of handle 128, the projections 120', 122', and 124' move into notches provided in the outwardly opening channels of the sash frame members. Two such notches 130 are shown in Fig. 22. The sash frames are thereupon effectively blocked against vertical movement in either direction, thereby preventing movement of the sash frames from the outside. The lock 126 is shown in its locking position in Figs. 26 and 27.

Lock 126 is provided with a pin 132 which extends through slot 134 in the guide rail. Slot 134 is countersunk to cooperate with the undercut head 136 on pin 132.

It will be evident that the screen sash may be provided with notches near its top edge and near its bottom edge to permit the window to be locked open with the screen either at the top or at the bottom. For this purpose, of course, the two window sash frames must also be notched at the top and bottom. If it be desired that the window may be locked in a number of partially closed positions, a plurality of notches may be provided along the cooperating edge in one of the window sash frames.

For easy manipulation of the sash frames, handles 138 and 140 may be provided on the screen and glass sash frames, respectively. An alternative handle 142 for a glass sash frame is shown in Fig. 31. Handle 142 does not project out beyond the boundary plane of the sash, and makes the three sash frames completely interchangeable.

Operation

The functioning of a window made according to this invention will be readily understood by those skilled in the art by the foregoing description and from the following explanation:

A window approximately the size desired is adjusted to fit the opening in the building wall by adjusting the edge members 8, 10 and 12, 14 in their respective recesses in the window and frame members 4 and 6. The window is secured to the building wall by means of screws 58. For removal of the sash frames in the embodiment shown in Figs. 1-7, inclusive, all the sash frames are pushed to the top. The displaceable guide rail portions 24 are then removed by means of a knife blade, screwdriver, or similar instrument being introduced into the notch 52 in back of the guide rail portion 24. By this means, the displaceable guide rail portion 24 is moved to the right as seen in Fig. 6, expanding the portion 50 of clip 46 to permit the passage of head 42 of pin

40. With the displaceable guide rail portions 24 on both sides removed and out of the way, the sash frames may then be moved down one by one from the top half of the window and taken out for cleaning, repairs, or the like.

The removal of the sash frame from the embodiment shown in Figs. 13–16, inclusive, is accomplished by sliding the sash frames into the lower half of the window. The retaining member 82 is then slid upward by means of handle 84 to permit the displaceable guide rail portions 76 to be pivoted inward against the limits provided by stop pin 78 in elongated opening 80 (see Fig. 15). Any or all of the sash frames may then be removed by sliding them upward and out.

It will, of course, be understood by those skilled in the art, that replacement of the sash frames may be accomplished by the reverse of the foregoing process.

Locking of the window is accomplished by moving the sash frames into position so that the notches 130 register with the lock section 126, and by pulling on handle 128 to move the lock into locking position as seen in Fig. 27.

I claim:

1. In a window, a frame, a screen sash frame and two sash frames each fitted with a transparent membrane, the sash frames being slidable in the first-named frame, the first-named frame being recessed at its outer edges, and telescoping members fitting in the recesses to provide for a variable outside dimension of the window.

2. In a window, a frame forming a closed rectangle having recesses at its outer edges on three sides of the rectangle, two edge members in each such side having a telescoping fit in the recess, a bridge member telescoping with each pair of said edge members, means cooperable with two pairs of edge members to secure the window to a building, guide rails on two inner edges of the frame, and three sash frames slidable in the frame on the guide rails.

3. In a window, a frame having inwardly directed channels at opposite sides thereof, guide rails fitting snugly in and retained at opposite sides thereof by said channels, vertically movable sashes mounted in the frame and on said guide rails, each guide rail having an inwardly extending longitudinal rib for each of said sashes and the sashes having outwardly directed grooves at opposite sides thereof receiving said ribs and slidable on said ribs, each guide rail comprising separate upper and lower portions, one portion being securely fastened to the frame and the other portion being detachably fastened to the frame, said securely fastened guide rail portions being substantially the same length as the sashes and said sashes being removable from the frame when said detachable rail portions are removed from the frame, and leaf-spring members fastened in the grooves of said sashes at the sides thereof, said spring members being removable with the sashes and engaging said ribs when the sashes are mounted in the frame and urging the sashes sideways against the ribs on which they travel.

4. In a window, a frame having inwardly directed channels at opposite sides thereof, guide rails fitting snugly in and retained at opposite sides thereof by said channels, each guide rail having a plurality of inwardly extending laterally spaced longitudinal ribs, a plurality of vertically movable sashes mounted in the frame having outwardly directed grooves at opposite sides thereof receiving said ribs and slidable on said ribs, and spring means at the sides of the grooves coactive with the sashes and the ribs and operative to urge the sashes continuously and resiliently in a direction transverse to the plane of the sashes and against said ribs.

5. In a window, a frame assembly having a plurality of laterally spaced vertical ribs at opposite sides thereof, a plurality of vertically movable sashes mounted in the frame having outwardly directed grooves at opposite sides thereof receiving said ribs and slidable on said ribs, and spring means in and at the sides of the grooves coactive with the sashes and the ribs and operative to urge the sashes continuously and resiliently in a direction transverse to the plane of the sashes and against said ribs.

6. In a window, a frame having guide rails at opposite sides thereof, vertically movable sashes mounted in the frame and on said guide rails, each guide rail comprising separate upper and lower portions, one portion being securely fastened to the frame and the other portion being detachable, said detachable portions being disposed entirely below the sashes when the latter are positioned on said securely fastened portions and at one end of the frame, means including a spring-holding element coactive with the upper ends of said detachable guide-rail portions to retain the latter, and a raised bead extending substantially entirely across the bottom of the frame and abutting the lower ends of said detachable guide-rail portions and adapted to extend into a co-operating groove in the bottom edge of one sash, said bead serving a double function of providing a weather seal for the sash and abutments for the detachable guide rail portions whereby to assist said spring-holding means in retaining the detachable guide rail portions.

7. In a window, a frame having guide rails at opposite sides thereof, vertically movable sashes mounted in the frame and on said guide rails, each guide rail comprising separate upper and lower portions, one portion being securely fastened to the frame and the other portion being detachable, said detachable portions being disposed entirely below the sashes when the latter are positioned on said securely fastened portions and at one end of the frame, means including a spring-holding element coactive with the upper ends of said detachable guide rail portions to retain the latter, and abutment means on the bottom of the frame engaging the lower ends of said detachable guide rail portions and cooperating with said spring-holding means to retain the removable guide rail portions.

8. In a window, a frame having guide rails at opposite sides thereof, vertically movable sashes mounted in the frame and on said guide rails, each guide rail comprising separate upper and lower portions, one portion being securely fastened to the frame and the other portion being detachable, said detachable portions being disposed entirely below the sashes when the latter are positioned on said securely fastened portions and at one end of the frame, abutment means on the bottom of the frame engaging the lower ends of said detachable guide rail portions to retain the same and means detachably fastening the upper ends of said detachable guide rail portions to said frame.

9. In a window, a frame, a plurality of vertically movable sashes mounted in the frame, said frame having a plurality of laterally spaced, vertical ribs extending inwardly from opposite sides thereof and interfitting with the sashes to guide the same during vertical travel thereof in the frame, and spring means interacting between the sashes and the ribs disposed at the sides of the sashes and operative to urge the sashes continuously and resiliently in a direction transverse to the plane of the sashes and against said ribs.

FRANK WILLIAM KNOTT.

REFERENCES CITED

The following references are of record in the file of this patent:

UNITED STATES PATENTS

| Number | Name | Date |
|---|---|---|
| 124,491 | Hornbake | Mar. 12, 1872 |
| 167,935 | Pruyn | Sept. 21, 1875 |
| 318,736 | Holmes | May 26, 1885 |
| 542,726 | Cleveland | July 16, 1895 |
| 874,093 | Logan | Dec. 17, 1907 |
| 1,037,662 | Roberts | Sept. 3, 1912 |
| 1,047,049 | Hartsfield | Dec. 10, 1912 |
| 1,229,744 | Guie et al. | June 12, 1917 |
| 1,391,602 | Abramson | Sept. 20, 1921 |
| 1,432,577 | Tedder | Oct. 17, 1922 |
| 1,545,875 | Austin | July 14, 1925 |
| 1,679,632 | Schlegel | Aug. 7, 1928 |
| 1,730,757 | Casha | Oct. 8, 1929 |
| 1,744,980 | McCarty | Jan. 28, 1930 |
| 1,897,010 | Pollock et al. | Feb. 7, 1933 |
| 1,950,881 | Felsing | Mar. 13, 1934 |
| 2,057,975 | Plym | Oct. 20, 1936 |
| 2,077,056 | Plym | Apr. 13, 1937 |
| 2,121,714 | Rose | June 21, 1938 |
| 2,131,099 | Edwards | Sept. 27, 1938 |
| 2,136,273 | Chaffee et al. | Nov. 8, 1938 |
| 2,141,348 | De Pietro | Dec. 27, 1938 |
| 2,291,726 | Kaufmann | Aug. 4, 1942 |
| 2,357,119 | Kirkpatric | Aug. 29, 1944 |
| 2,375,974 | Courson | May 15, 1945 |
| 2,430,772 | Kammerer | Nov. 11, 1947 |
| 2,467,511 | Van Fleet | Apr. 19, 1949 |
| 2,475,885 | Geyser | July 12, 1949 |
| 2,477,942 | Renton | Aug. 2, 1949 |

FOREIGN PATENTS

| Number | Country | Date |
|---|---|---|
| 13,740 | Great Britain | 1893 |